United States Patent [19]

Tsukada et al.

[11] Patent Number: 5,413,893
[45] Date of Patent: May 9, 1995

[54] OPTICAL INFORMATION RECORDING MEDIUM

[75] Inventors: Harumichi Tsukada, Kanagawa; Etsuji Akimoto; Masahiro Tsumura, both of Hyogo, all of Japan

[73] Assignee: Daicel Chemical Industries, Ltd., Osaka, Japan

[21] Appl. No.: 45,121

[22] Filed: Apr. 12, 1993

Related U.S. Application Data

[60] Division of Ser. No. 799,886, Dec. 2, 1991, abandoned, which is a continuation of Ser. No. 511,189, Apr. 19, 1990, abandoned.

[30] Foreign Application Priority Data

Apr. 28, 1989 [JP] Japan ................................. 1-111317

[51] Int. Cl.⁶ .......................... G03C 1/73; G03C 5/60
[52] U.S. Cl. ..................... 430/152; 430/273; 430/275; 430/270; 430/945
[58] Field of Search ............... 430/152, 945, 495, 270, 430/271, 273, 275, 290

[56] References Cited

U.S. PATENT DOCUMENTS

| | | | |
|---|---|---|---|
| 3,457,071 | 7/1969 | Notley et al. | 430/152 |
| 3,785,821 | 1/1974 | Notley | 430/152 |
| 4,042,391 | 8/1977 | Fukutani et al. | 430/152 |
| 4,230,939 | 10/1980 | de Bont et al. | 235/488 |
| 4,328,303 | 5/1982 | Ronn et al. | 430/346 |
| 4,339,520 | 7/1982 | Seibel et al. | 430/270 |
| 4,415,650 | 11/1983 | Kido et al. | 430/273 |
| 4,430,414 | 2/1984 | Swanson | 430/70 |
| 4,465,767 | 8/1984 | Oba et al. | 430/271 |
| 4,510,512 | 4/1985 | Okamoto et al. | 346/209 |
| 4,622,284 | 11/1986 | West et al. | 430/290 |
| 4,673,626 | 6/1987 | Takeda et al. | 430/14 |
| 4,809,022 | 2/1989 | Wilkinson et al. | 346/135.1 |
| 4,845,000 | 7/1989 | Takeoka et al. | 430/290 |
| 4,933,221 | 6/1990 | Nishimura et al. | 428/64 |
| 4,985,345 | 1/1991 | Hayakawa et al. | 430/335 |
| 5,041,356 | 8/1991 | Takeda et al. | 430/273 |

FOREIGN PATENT DOCUMENTS

| | | |
|---|---|---|
| 61-162386 | 7/1986 | Japan . |
| 61-258787 | 11/1986 | Japan . |
| 62-239436 | 10/1987 | Japan . |
| 63-299980 | 12/1988 | Japan . |
| 63-299986 | 12/1988 | Japan . |
| 1-110185 | 4/1989 | Japan . |
| 850954 | 10/1960 | United Kingdom ............ 430/152 |
| 956337 | 4/1964 | United Kingdom ............ 430/152 |

OTHER PUBLICATIONS

T977001 Huffey et al Dec. 5, 1978.

Primary Examiner—Lee C. Wright
Attorney, Agent, or Firm—Birch, Stewart, Kolasch & Birch

[57] ABSTRACT

An optical information recording medium comprises (1) a base, (2) at least one recording film provided on the base, being capable of bringing about a change in light tranmittance upon being exposed to an optical and/or thermal energy of an incident laser beam, and (3) a reflective film provided on the recording film. The optical information recording medium can exhibit a high contrast and is interexchangeable with CD and LV.

10 Claims, 1 Drawing Sheet

OPTICAL INFORMATION RECORDING MEDIUM

This application is a divisional of application Ser. No. 07/799,886 filed on Dec. 2, 1991 abandoned, the entire contents of which are hereby incorporated by reference, which is a continuation application of Ser. No. 07/511,189, filed on Apr. 19, 1990, now abandoned.

The present invention relates to a direct-read-after-write information recording medium. More particularly, the present invention is concerned with an optical information recording medium which can exhibit a sufficiently high contrast by lowering a high reflectance, which the medium has had before recording, after recording and is interchangeable with an existing compact disk (CD) and laser vision (LV).

(PRIOR ART STATEMENT)

Phonographic discs and magnetic tapes have hitherto been used as a recording medium for audio uses in industries and in private life.

In recent years, however, with the advance of a signal processing technique for quantizing a voice, the use of the compact disk (CD) has rapidly been expanded. The compact disk is a reproduction-only optical disk which can only read out information through the use of a laser beam and comprises a plastic base having quantized signals formed in the form of a pit and coated with a reflective film of a thin aluminum film, etc. Laser vision (LV), wherein an image is recorded in the form of an analog signal or a quantized signal in a similar shape has also been expanded.

Beside the above-described read-only optical disks, a writable optical disk has been developed mainly for document filing and is now under expansion. However, the writable optical disk has a drawback in that it cannot be used in the existing reproduction-only optical disk player, because:

(1) the reproduction-only optical disk utilizes a highly reflective thin metal film of, e.g., aluminum or gold to attain a reflectance of about 70% or more, while the writable optical disk uses a material of a low reflectance, and (2) most writable optical disks must have a double-sided disk structure wherein an air gap is sandwiched between the recording surfaces for the purpose of facilitating pit formation during recording and protecting the pits after recording, so that the thickness of the disk must be at least the double of that of the reproduction-only optical disk comprising a single sheet, thus failing to meet the specifications for a reproduction-only optical disk player.

(SUMMARY OF THE INVENTION)

The present inventors have made extensive and intensive studies with a view to eliminating the above-described drawback. As a result, the present invention have found that an optical information recording medium comprising a recording film provided on a base and capable of bringing about a change in the light transmittance before and after the recording due to absorption of the energy of an incident laser beam, and a reflective thin metal film provided on the recording film and a protective film provided on the reflective film, necessitates no sandwich structure and can be used as a writable optical information recording medium compatible with the existing reproduction-only optical disk player. This finding has led to the completion of the present invention.

Accordingly, the present invention provides an optical recording medium, characterized by comprising at least one recording film provided on a base and capable of bringing about a change in the light transmittance upon being exposed to an incident laser beam energy and/or a thermal energy, and a reflective film provided on said recording film.

The optical information recording medium comprises (1) a base, (2) at least one recording film provided on the base, being capable of bringing about a change in light tranmittance upon being exposed to an optical and/or thermal energy of an incident laser beam., and (3) a reflective film provided on the recording film. It can exhibit a high contrast and is interchangeable with CD and LV.

It is preferable that the recording film is composed of a substance being capable of bringing about a change in light transmittance upon being exposed to an optical and/or thermal energy of an incident laser beam. The recording film may comprise a thin film of a thermoplastic resin and a compound, contained in the thin film, being capable of generating gas molecules by decomposing when exposed to an incident laser beam.

The medium may further comprise a protective film on the reflective film.

The recording film serving as the first layer of the optical information recording medium of the present invention is formed so that the light transmittance after the recording differs from that existing before the recording by the energy of a laser beam. Examples of preferable methods for attaining this purpose include those described hereinbelow.

(1) The recording film is formed of a substance which chemically changes upon being exposed to an incident laser beam energy and/or a thermal energy.

The substance may be any of organic and inorganic substances as long as it has a light transmittance which changes according to the chemical change.

(2) The recording film is formed of a thin film of a thermoplastic resin containing a substance which generates gas molecules upon being decomposed.

The above-described compound is formed by the energy of a laser beam to change the light transmittance of the recording film.

Specifically, when a thin film of a thermoplastic resin is used as a recording film and a compound capable of generating gas molecules upon being decomposed is incorporated therein, the recording film comprises a thin and uniformly applied thermoplastic film and a compound capable of generating gas molecules upon being decomposed by the energy of a laser beam is contained in this thermoplastic resin film. When the above-described recording film is subjected to ultraviolet radiation, etc., the above-described compound is decomposed to generate gas molecules which are trapped in a compressed state within the thermoplastic resin. Condensing a laser beam thereon causes the thermoplastic resin to be softened and, at the same time, the gas molecules trapped in a compressed state to be expanded, so that cells are formed within the resin. The cells brings about diffused reflection of the incident light to lower the transmittance, thus effecting the recording of signals.

Thus, according to the optical information recording medium of the present invention, a recording layer capable of bringing about a change in the light transmittance, before and after the recording due to absorption of the energy of a laser beam is provided between a base and a reflective film, and the reflectance of the reflective film is changed through the utilization of the change in the light transmittance of the recording film, thereby attaining a contrast sufficient to record signals and, at the same time, eliminating the necessity of the air sandwich structure through the selection of a suitable material for the reflective film.

The optical information recording medium of the present invention has a recording film capable of bringing about a change in the transmittance through absorption of the energy of a laser beam between a reflective film and a base and the reflective, film comprises a material having a high reflectance, which enables a high contrast to be provided before and after the recording.

Further, according to the present invention, it is possible to prepare a writable optical disk which eliminates the necessity of an air sandwich structure and can be used in the form of a single sheet.

Figure 1:
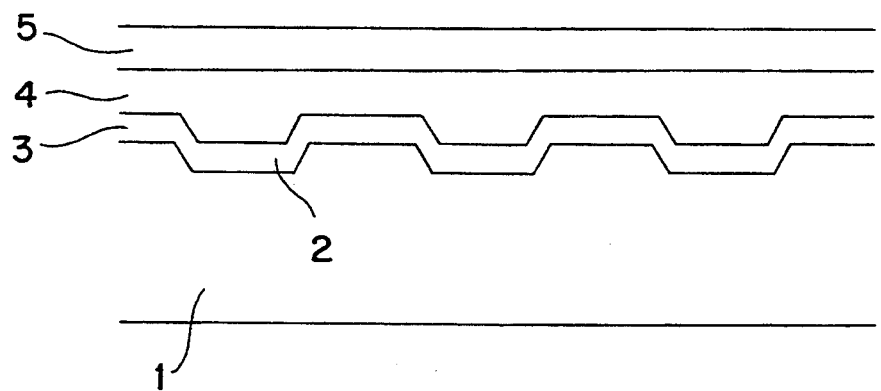
FIG. 1. is a schematic cross-sectional view of a film structure of the optical information recording medium of the present invention before laser beam radiation.

1 ... base
2 ... recording guide groove
3 ... recording film
4 ... reflective film
5 ... protective film
6 ... portion having lowered transmittance due to irradiation with laser beam

DETAILED DESCRIPTION OF THE INVENTION

The present invention will now be described in greater detail.

Although the reflective film is preferably one having a high reflectance, i.e., one having a reflectance of 70% or more, selected from among materials capable of reflecting a laser beam penetrating through the recording film and although gold and aluminum are preferred, the reflective film is not necessarily limited to these materials but other alloys may be used as long as they have a high reflectance.

The protective film provided directly on the reflective film is formed of a material commonly used in the art, such as UV-curable resins.

FIG. 1 is a cross-sectional view of one embodiment of the present invention, wherein numeral 1 designates a plastic base, numeral 2 a groove for recording a signal, numeral 3 a recording film for lowering the transmittance through energy absorption, numeral 4 a reflective film having a reflectance of 70% or more, and numeral 5 a protective film for protecting the reflective film from damages.

Regarding the formation of the above-described films, the recording film is prepared by forming a film through spin coating or deposition when an organic material is used for constituting the recording film, and through deposition, sputtering, etc. when an inorganic substance is used, and regulating the film thickness in the range of 15 nm to 8 $\mu$m. Alternatively, the recording film may be prepared by forming a film through thin film roller coating or spin coating of a thermoplastic resin and regulating the film thickness in the range of 5 to 20 $\mu$m.

The reflective film is prepared by forming a metallic film through vacuum deposition or sputtering. The formation of the film is controlled in respect to thickness in the range of 10 to 200 nm. The protective film is prepared, e.g., by spin coating an UV-curable resin to have a thickness of 3 to 30 $\mu$m.

[EXAMPLES]

The present invention will now be described in more detail by way of the following Examples, but the present invention is not limited to these Examples.

EXAMPLE 1

In FIG. 1, a recording film 3 having a thickness of 2 $\mu$m was formed on a base 1 having a recording guide groove (pit) 2 by making use of a mixture of a leuco dye represented by the following formula (I) with a phenolic compound represented by the following formula (II):

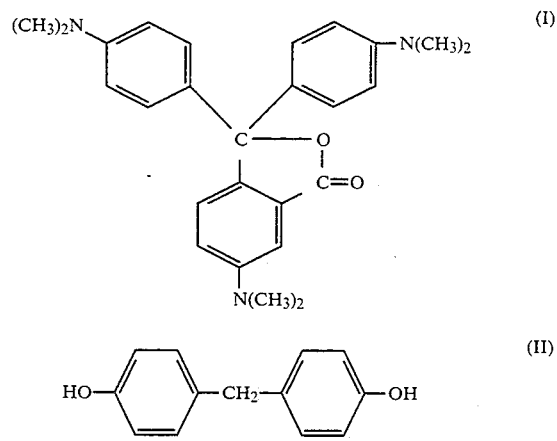

A reflective film 4 comprising a thin gold film of a thickness of 20 nm was provided on the recording film 3, and spin-coated with an UV-curable resin SD17 (a product of Dainippon Ink & Chemicals, Inc.) to form a protective film 5 having a thickness of 10 $\mu$m, thereby preparing an optical information recording medium.

The optical information recording medium thus formed was irradiated with a laser beam to chemically change the above-described mixture constituting the recording film 3.

Figure 2:
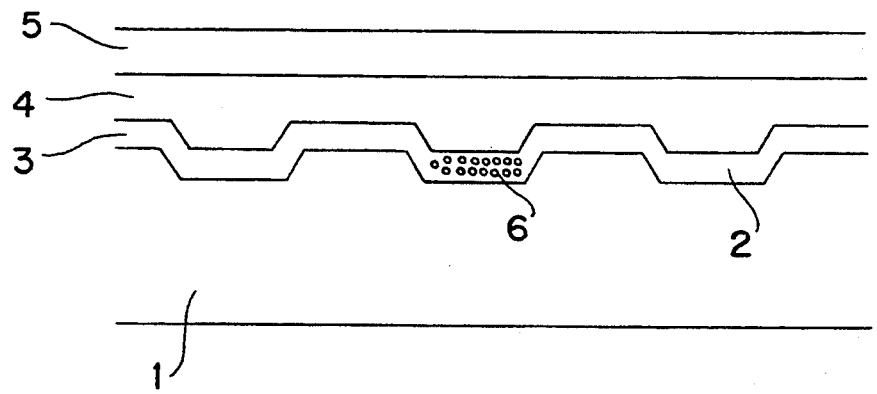
FIG. 2 is a schematic cross-sectional view of a film structure of the optical information recording medium of the present invention after laser beam radiation.

As shown in FIG. 2, irradiation with a laser beam produces a blackened portion 6 having a lowered transmittance due to the chemical change in the recording film 3. This portion intercepted the laser beam, and the reflectance was lowered to 23%. This provides a sufficient contrast against a reflectance of 72% of the unrecorded portion.

In the optical information recording medium thus prepared, the C/N ratio determined by recording a signal of 720 kHz at a linear velocity of 1.2 m/sec was 47 dB.

EXAMPLE 2

In FIG. 1, a base 1 having a recording guide groove (pit) 2 was spin-coated with a dispersion of a diazonium salt represented by the following formula (III) in an alcoholic solution of a thermoplastic resin cellulose acetate to form a recording film 3 having a thickness of 8 μm.

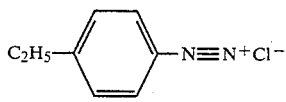
(III)

A reflective film 4 comprising a thin gold film of a thickness of 20 nm was provided on the recording film 3, and spin-coated with an U currable resin SD17 (a product of Dainippon Ink & Chemicals, Inc.) to form a protective film 5 having a thickness of 10 μm, thereby preparing an optical information recording medium.

The entire surface of the optical information recording medium was first exposed to an ultraviolet ray to decompose the diazonium salt contained in the recording film, thereby generating a nitrogen gas. The generated nitrogen gas does not give rise to a cell in this stage, and trapped in a compressed state in the recording film 3. In this state, when a laser beam condensed to about 1 μm is applied, the nitrogen gas in a compressed gas expands within the recording film 3 softened by the heat to form a cell.

In FIG. 2, a portion 6 having a lowered transmittance due to a diffused reflection caused by the formation of a cell through irradiation with a laser beam intercepted a laser beam, and the reflectance was lowered to 27%. This provides a sufficient contrast against a reflectance of 73% of the unrecorded portion.

In the optical information recording medium thus prepared, the C/N ratio determined by recording a signal of 720 kHz at a linear velocity of 1.2 m/sec was 51 dB.

We claim:

1. A method of writing information on a writable optical disk comprising:
   a) subjecting to ultraviolet radiation a writable optical disk which has a recording layer comprising a thin film of a thermoplastic resin and a compound which generates compressed gas molecules when exposed to said ultraviolet radiation; and
   b) subsequently subjecting said optical disk to the thermal energy of an incident laser beam condensed to a diameter of no greater than 1 μm.

2. The method of claim 1 wherein the entire optical disk is subjected to said ultraviolet radiation.

3. The method of claim 1 wherein said thermal energy of said laser beam results in the formation of bubbles.

4. The method of claim 1 wherein said compound which generates compressed gas molecules is a nitrogen-containing molecule.

5. The method of claim 4 wherein said nitrogen-containing molecule is

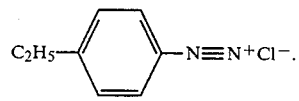

6. The method of claim 1 wherein said optical disk is a compact disk.

7. The method of claim 1 wherein said optical disk is a laser vision disk.

8. A method of writing information on a direct-read-after-write optical disk which has a recording layer comprising a thin film of a thermoplastic resin and a compound which generates compressed gas molecules when exposed to ultraviolet radiation comprising:
   a) first forming compressed gas molecules in the recording layer of said optical disk by exposing the entire optical disk to ultraviolet radiation; and
   b) then forming bubbles at discrete locations on said optical disk by softening said recording layer with the thermal energy of an incident laser beam condensed to a diameter of no greater than 1 μm.

9. The method of claim 8 wherein said compressed gas molecules are nitrogen.

10. A method of writing information on a direct-read-after-write optical disk, wherein said optical disk comprises a base, a recording layer and a layer of high reflectance, comprising lowering the reflectance of said layer of high reflectance by forming bubbles in said recording layer by:
   a) subjecting said optical disk to ultraviolet radiation thereby decomposing a nitrogen-containing compound in said recording layer to form compressed gas molecules; and
   b) subjecting said optical disk to the thermal energy of an incident laser beam condensed to a diameter of no greater than 1 μm; softening said recording layer; and thereby forming bubbles in said recording layer due to the expansion of said compressed gas molecules.

* * * * *